(12) United States Patent
Chen et al.

(10) Patent No.: US 8,195,853 B2
(45) Date of Patent: Jun. 5, 2012

(54) KEYBOARD-VIDEO-MONITOR-PERIPHERY (KVMP) SWITCH

(75) Inventors: Hsin Chang Chen, Xizhi (TW); Ya Lin Chen, Sijhih (TW)

(73) Assignee: Aten International Co., Ltd., Shijr (TW)

( * ) Notice: Subject to any disclaimer, the term of this patent is extended or adjusted under 35 U.S.C. 154(b) by 264 days.

(21) Appl. No.: 12/389,328

(22) Filed: Feb. 19, 2009

(65) Prior Publication Data

US 2010/0211709 A1    Aug. 19, 2010

(51) Int. Cl.
*G06F 13/12* (2006.01)
(52) U.S. Cl. .................................... 710/73; 710/62
(58) Field of Classification Search .............. 710/73
See application file for complete search history.

(56) References Cited

U.S. PATENT DOCUMENTS

| | | | |
|---|---|---|---|
| 6,557,170 B1 * | 4/2003 | Wilder et al. | 725/130 |
| 6,957,287 B2 * | 10/2005 | Lou et al. | 710/72 |
| 7,284,278 B2 * | 10/2007 | Anson et al. | 726/34 |
| 2006/0146491 A1 * | 7/2006 | Chen | 361/683 |
| 2006/0202964 A1 | 9/2006 | Liaw et al. | |
| 2007/0174535 A1 | 7/2007 | Lou et al. | |
| 2008/0091858 A1 | 4/2008 | Zhang et al. | |
| 2008/0102708 A1 * | 5/2008 | Wu | 439/652 |
| 2008/0162752 A1 | 7/2008 | Huang | |
| 2009/0187686 A1 * | 7/2009 | Goodart et al. | 710/72 |

OTHER PUBLICATIONS

Belkin, "OmniView SOHO Desktop KVM Switch", unknown date.
Beijing Bottom Times Network Equipment Co. Ltd., "Model MAV108", "http://www.bottomnt.com/kvm/mav108.htm", 1 page, printed from the internet on Apr. 6, 2011.

* cited by examiner

*Primary Examiner* — Henry Tsai
*Assistant Examiner* — Titus Wong
(74) *Attorney, Agent, or Firm* — Chen Yoshimura LLP

(57) ABSTRACT

Embodiments of the present invention describe KVMP switch system that can individually control each peripheral device and KVM ports connected to the KVMP switch system and methods of operating the same. In one embodiment, a KVMP switch system for switching includes a plurality of console and peripheral devices with any one of a plurality of computer servers includes a plurality of computer connector zones, each computer connector zone having a plurality of computer ports adapted to connect to a computer server, a console port zone having a plurality of console ports adapted to connect to at least a console device and a peripheral device, and a control zone having a plurality of selector switches and a toggle switch, the toggle switch having at least two operable positions, each selector switch associated with a respective one of the computer connector zones and operable to couple one or more selected computer ports of the associated computer connector zone to an associated the console port, the toggle switch operable to determine which computer ports are selected for switching by the selector switches.

27 Claims, 7 Drawing Sheets

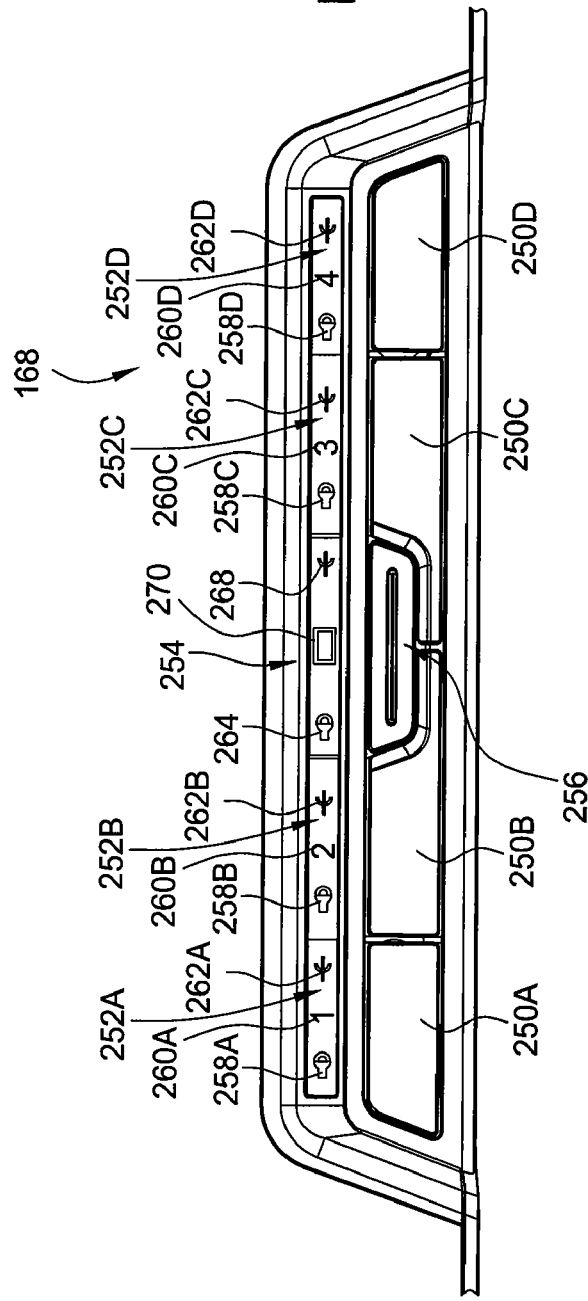
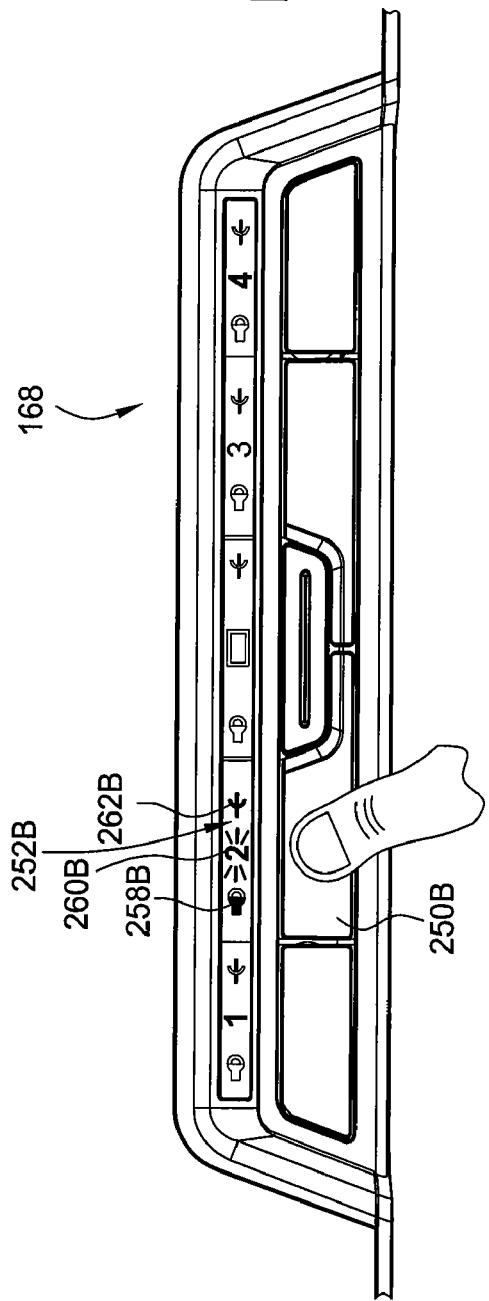

KEYBOARD-VIDEO-MONITOR-PERIPHERY (KVMP) SWITCH

BACKGROUND

1. Field of the Invention

Embodiments of the present invention generally relate to a keyboard-video-mouse peripheral (KVMP) switch system, more particularly, a keyboard-video-mouse peripheral (KVMP) switch system that can individually control KVM and peripheral channels in the KVMP switch system.

2. Description of the Related Art

Many computer servers capable of performing general purpose and specialized tasks require a computer room with raised floor and air conditioning. Due to tight office space requirements and high expense of the server room, there a continual demand to reduce the space occupied by the computer servers. In response to the demand for space reduction, Keyboard-Video-Mouse (KVM) switch systems have been developed to allow a single video display, a character input device and a pointing device (e.g., a set of console devices) to communicate with one or more computer servers by users, thereby reducing the overall server room space requirements.

As variations of computer device applications increase and additional channels are connected to servers, the KVMP switch system must now provide multiple channels that can be connected with Universal Serial Bus (USB) peripherals, such as USB hub, USB printer, USB scanner, USB camera, and so on. Typically, the switch between of a peripheral device is often synchronous with the switch over the channels of the computer server coupled in the same set of console devices. In other words, while switching the control of the console device among different servers and peripheral devices, the data flow communication between a first server and a peripheral device is often interrupted when a second server and a second peripheral device are connected through the KVMP switch system. However, synchronous interruption of the data flow between the peripheral device and the server can be a significant inconvenience and limits operational flexibility. In some conventional practices, additional buttons and/or complicated procedures are required to separately control switching between computer servers and peripheral devices. The complicated procedures are time consuming and often result in errors due to the user's confusion.

Therefore, there is a need for an improved KVMP switch system that can individually control switching of servers and peripheral devices coupled to the KVMP switch system,

SUMMARY OF THE INVENTION

Embodiments of the invention describe a KVMP switch system that can individually control switching among peripheral devices and computer servers coupled to the KVMP switch system. In one embodiment, a KVMP switch system includes a plurality of console and peripheral devices with any one of a plurality of computer servers includes a plurality of computer connector zones, each computer connector zone having a plurality of computer ports adapted to connect to a computer server, a console port zone having a plurality of console ports adapted to connect to at least a console device and a peripheral device, and a control zone having a plurality of selector switches and a toggle switch, the toggle switch having at least two operable positions, each selector switch associated with a respective one of the computer connector zones and operable to couple one or more selected computer ports of the associated computer connector zone to an associated the console port, the toggle switch operable to determine which computer ports are selected for switching by the selector switches.

In another embodiment, a method of operating a KVMP switch system includes operating a toggle switch of a KVMP switch system, the KVMP switch system having a plurality of selector switches, a plurality of computer connector zones and a console port zone, wherein each computer connector zone is associated with a respective one of the plurality of selector switches, wherein operating the toggle switch selects one or more predefined types of ports disposed in the computer connector zones for connection with the console port zone, and operating one of the selector switches to couple the associated computer connector zone to the console port zone, wherein only ports of the computer connector zone of the type selected by operation of the toggle switch are coupled by operation of the operated selector switch.

In yet another embodiment, a KVMP switch system for switching a plurality of console and peripheral devices with any one of a plurality of computer servers includes a housing, a switching circuit disposed in the housing, a control zone formed at an interface of a top and a front side of the housing, wherein the control zone has a first surface connected to a second surface, the first surface and the surface the first and the second surfaces defining an angle greater than 90 degrees.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings.

FIGS. 3A-3D depict front views of a control region of the KVMP switch system illustrating different control status.

Figure 1:
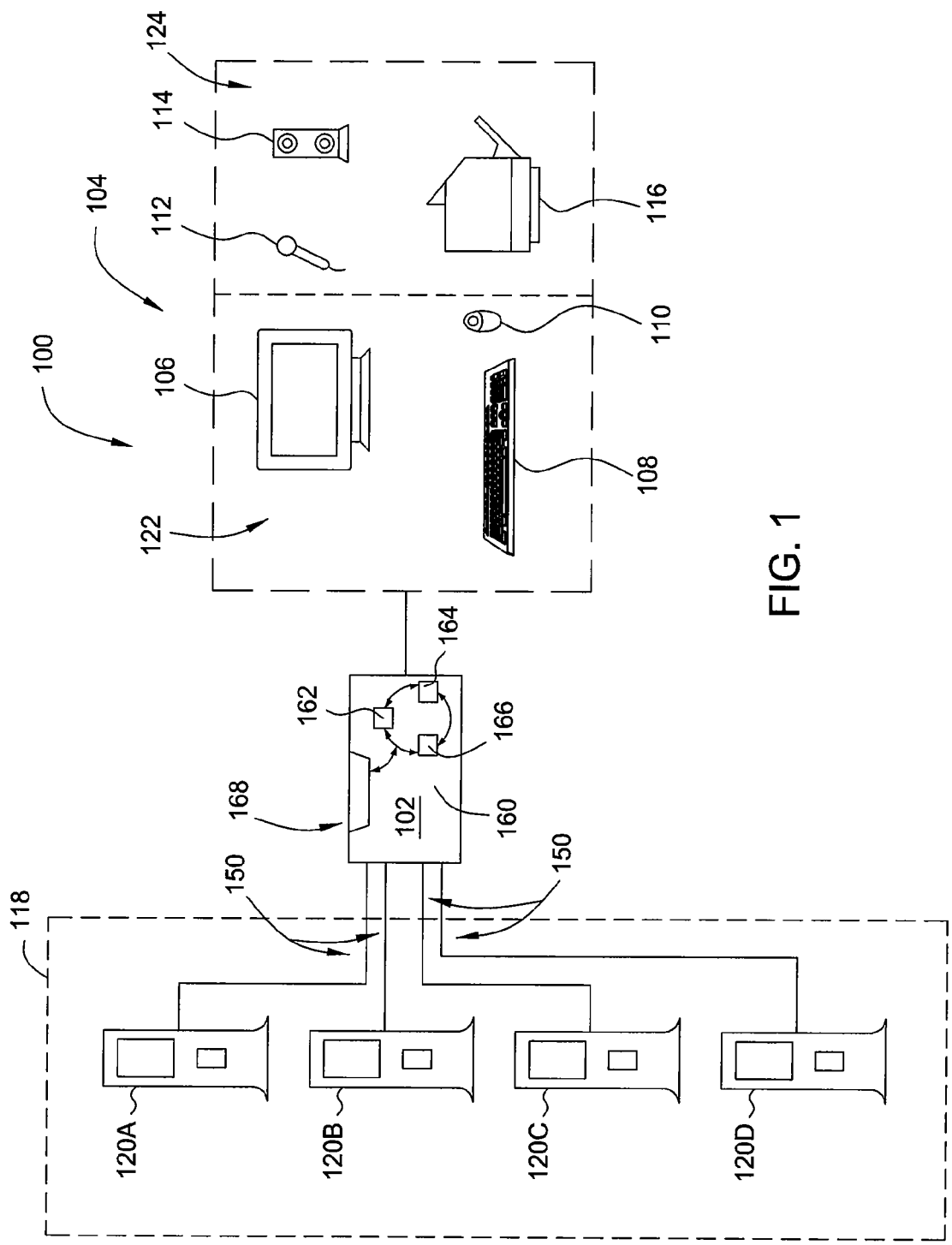
FIG. 1 depicts a schematic diagram of a hardware component having a KVMP switch system in accordance with one embodiment of the present invention.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present invention provide an improved KVMP switch system that can individually and separately control each peripheral device and computer server connected by the KVMP switch system. The individual control over each peripheral device and computer server facilitates switching between computer servers using the KVMP switch system without interrupting operation of the peripheral devices.

FIG. 1 depicts a schematic diagram of hardware components 100 which include a KVMP switch system 102 in accordance with one embodiment of the present invention. The hardware components 100 also include a computer server system 118 and a compatible console and peripheral module 104 (herein after console module 104). The KVMP switch system 102 facilitates signal communication between the computer server system 118 and the console module 104. In one embodiment, the computer server system 118 includes a plurality of computer servers, shown as computer servers 120A-D, connected to KVMP switch system 102. The computer servers 120A-D may be coupled to the KVMP switch system 102 through a respective cable 150. The cable 150 may be a wire conductor, USB, fiber optic cable, or other suitable data conducting device. Although four servers 120A-D are shown in FIG. 1, the computer server system 118 may be configured with more than or less than four servers.

The console module 104 includes one set of console devices 122 and a plurality of peripheral devices 124. The set of console devices 122 includes a monitor display 106, a keyboard 108 and a mouse device 110. Some peripheral devices 124, such as a microphone 112, audio speaker 114, a printer 116, or so on, may also be connected to the KVMP switch system 102. Details of the console module 104 to KVMP switch system connection will be further discussed below with referenced to FIGS. 2A-C.

In one embodiment, the KVMP switch system 102 includes a housing 160 that contains a processor 162, a memory 164 and support switch circuits 166. The support switch circuits 166 also includes circuitry that assists switching among ports of the KVMP switch system 102 connecting to the servers 120A-D to the console and periphery module 104.

A control zone 168 is provided on the housing 160 which provides command signals to the processor 162 when activated by a user. In response to one or more command signals, the processor 162 allows communication between a predefined one of the servers 120A-D to communicate with the console module 104. Other command signals may direct which the devices of the console module 104 are in communication with a selected server 120A-D through the system 102, as will be described in further detail below.

The KVMP switch system 102 allows a user to switch communications between the console device and peripheral module 104 to a particular computer server 120A-D. Using a single set of console devices 122 including the monitor display 106, keyboard 108 and mouse 110 to interface with each of the computer server 120A-D significantly saves space in the working environment and reduces cost of monitors and keyboards required to control each individual computer server 120A-D. Additionally, the peripheral devices 124 such as the printer 116, microphone 112 and audio speaker 114 can also be connected with the selected computer server 120A-D by the KVMP switch system 102.

Figure 2A:
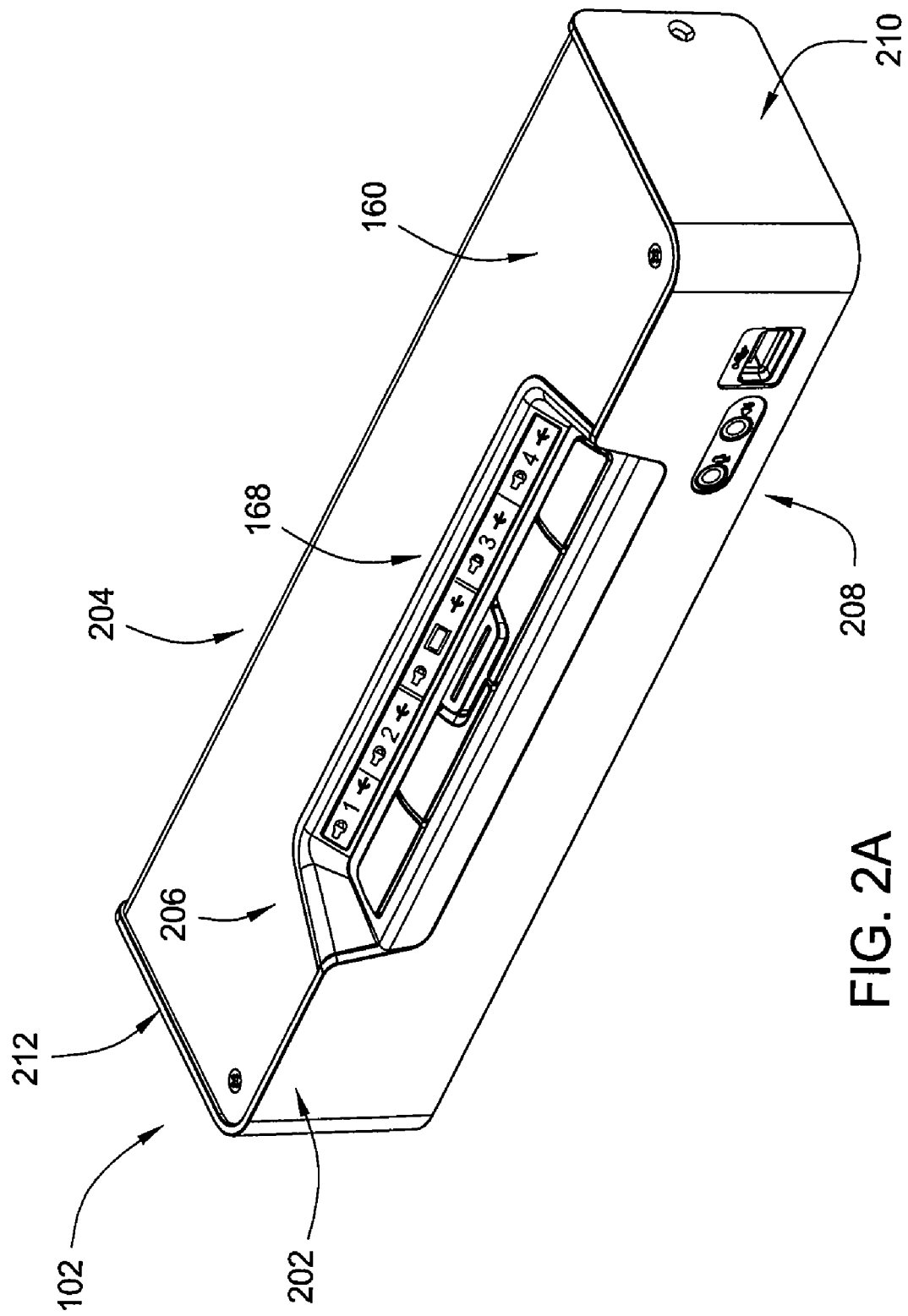
FIG. 2A depict a front isometric view of a KVMP switch system in accordance with one embodiment of the present invention.

FIG. 2A depicts a top isometric view of the KVMP switch system 102 depicted in FIG. 1 in accordance with one embodiment of the present invention. The housing 160 of the KVMP switch system 102 includes a top 206, a bottom 208, a front side 202, a back or rear side 204, and two lateral sides 210, 212. The control zone 168 is located proximate the interface between the top 206 and front side 202. The control zone 168 includes a plurality of buttons used to control operation of the KVMP switch system 102. It is contemplated that the control zone 168 may be located in other regions of the KVMP switch system 102, as desired.

Figure 2B:
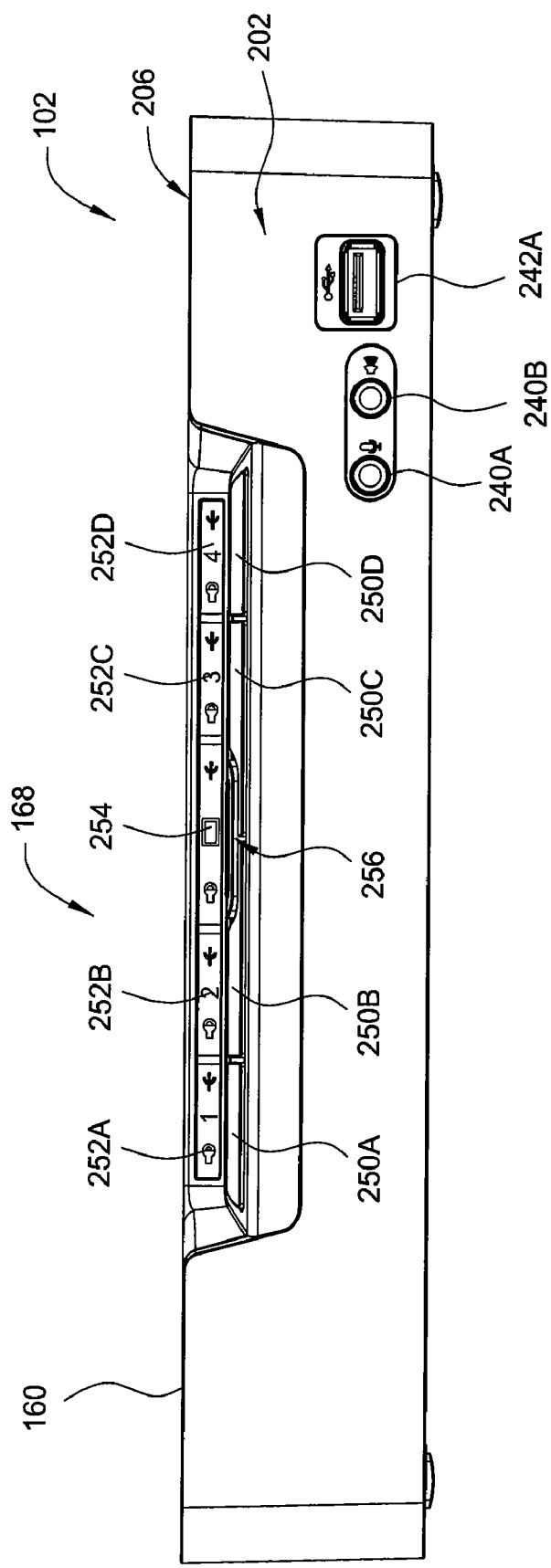
FIG. 2B depicts a front view of the KVMP switch system depicted in FIG. 2A.

FIG. 2B depicts a front view of the control zone 168 formed in the KVMP switch system 102. The control zone 208 has a plurality of selector switches 250A-D, a toggle switch 256 and a plurality of LED light zones 252A-D, 254. It is noted that the selector switches 250A-D and the toggle switch 256 may be in form of touch screens, mechanical buttons, electromechanical buttons, electronic switches, pressure sensitive panels, or other suitable signal generating device suitable for use as a selector switch. In one embodiment, the selector switches 250A-D and the toggle switch 256 are of the type that may be actuated by the touch of a user.

Each LED light zones 252A-D, 254 is configured to indicate the operational state of selector switch 250A-D as selected by operation of toggle switch 256. The selector switch 250A-D and toggle switch 256 can be actuated to provide a command signal to the processor 162 and support switch circuit 166 so that the system 102 selectively switches communication among the different servers and peripheral devices coupled to the KVMP switch system 102. The toggle switch 256 is configured to individually switch control among servers and peripheral devices coupled to the KVMP switch system 102 to the console and peripheral device 104. Operation of the each selector switch 250A-250D and toggle switch 256 will be further described below with reference to FIGS. 3A-D.

A set of easy access audio ports 240A, 240B and a USB port 242A are located on the front side 202 of the KVMP switch system 102. The easy access audio ports 240A, 240B may include a microphone/IP phone/headphone port 240A and a speaker port 240B. The USB port 242A may be used for connection to a variety of USB compatible peripheral devices, such as a printer, scanner, camera, and the like. The position of easy access audio and USB ports 240A, 240B, 242A allows users to easily connect peripheral devices to the KVMP switch system 102, thereby eliminating the inconvenience of having to access the rear side 204 during port connection.

Figure 2C:
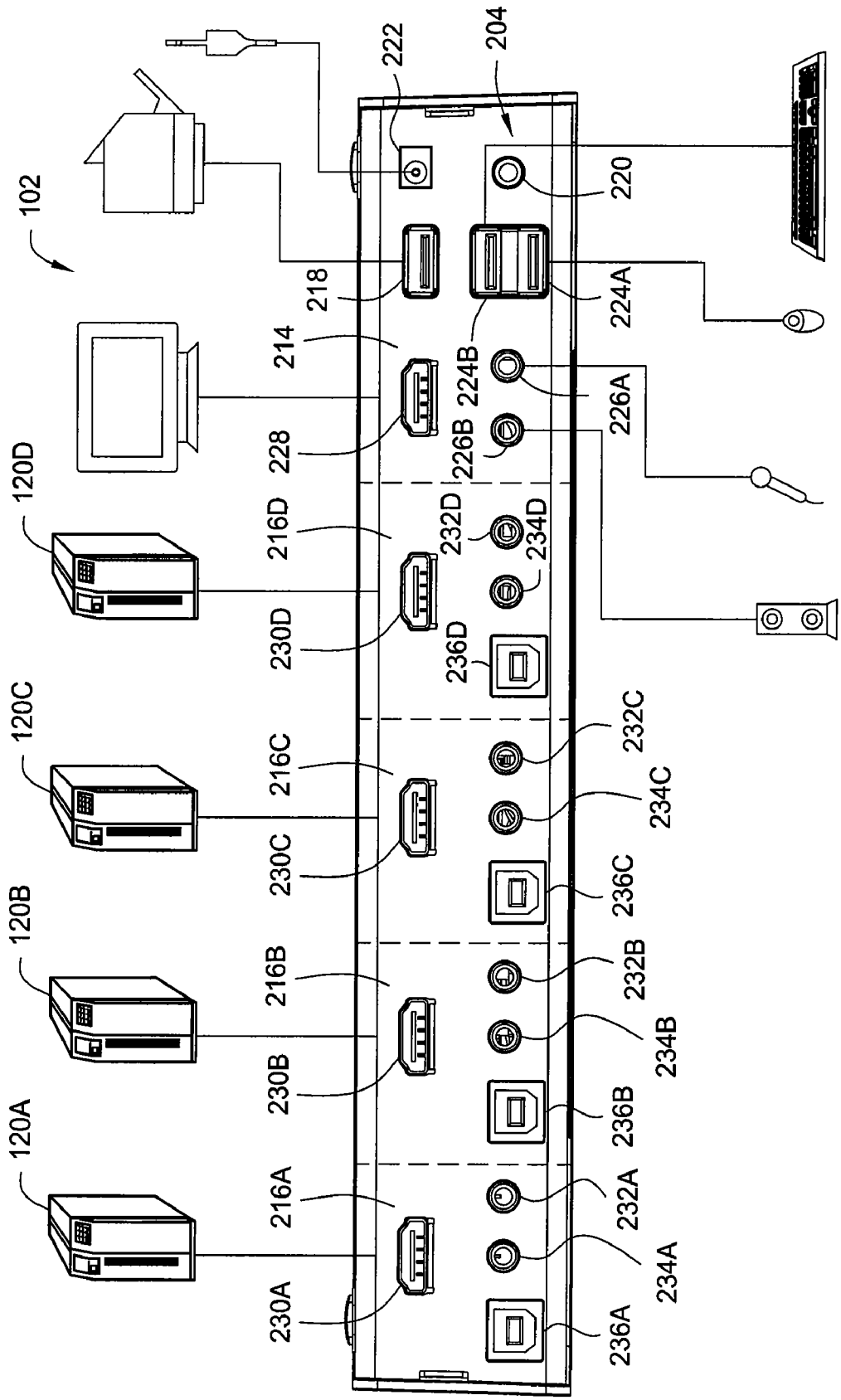
FIG. 2C depicts a rear elevation of the KVMP switch system depicted in FIG. 2A.

FIG. 2C depicts an elevation of the back side 204 of the KVMP switch system 102. The back side 204 of the KVMP switch system 102 is divided into multiple zones 214, 216A-D to facilitate connection of different devices to the different ports located in the zones 214, 216A-D. The zones include a console port zone 214 and multiple computer connector zones 216A-D. The console port zone 214 provides multiple ports for connection to the console device and peripheral module 104 (as shown in FIG. 1) so that a user may control selected servers though the console devices 122 connected to the console port zone 214. Each computer connector zone 216A-D may be configured to connect to a respective one of the computer servers 120A-120D of the computer server system 118. It is noted that although four computer connector zones 216A-D are shown in the KVMP switch system 102 the number of the computer connector zones 216A-D may be varied as desired to accommodate more or fewer servers. In the embodiment where more computer servers are required to connect to the KVMP switch system 102, the number of the computer connector zones 216A-D may be proportionally increased or vise versa.

In one embodiment, the console port zone 214 includes a power connection port 222, a firmware update port 220, more than one USB ports 218, 224A-B, a video connection port 228, a speaker connection port 226A, and a microphone connection port 226B. The power connection port 222 may be connected with a power cable that provides DC power. The firmware update port 220 facilitates connection to a cable that can transmit information to the KVMP switch system 102 to update software and firmware stored in the memory 164 embedded in the KVMP switch system 102.

The first USB port 218 may be connected to a peripheral device, such as a printer, camera or scanner. It is noted that other suitable peripheral devices may also be connected to the first USB port 218. The second USB port 224A and the third USB port 224B are configured to respectively connect to the mouse 110 and the keyboard 108. It is noted that the order and configuration of the first USB port 218, the second USB port 224A, and the third USB port 224B formed on the console port zone 214 may be changed or reserved in any order as needed. A High Definition Multimedia Interface (HDMI) compatible connection port 228 is formed in the console port zone 214 to provide connection to a HDMI connector for a video display in the present embodiment. However, it is contemplated that other interface compatible connection port can be used, such as Digital Visual Interface (DVI) interface, Video Graphic Array (VGA) interface and so on. The second USB port 224A and the third USB port 224B along with the HDMI compatible connection port 228 allows the console devices 122 to remotely control servers connected to the computer connection zones 216A-D through the KVMP switch system 102.

A set of ports comprising a speaker port 226A and a microphone port 226B are also formed in the console port zone 214. The speaker port 226A and the microphone port 226B can be connected with the audio speakers 114 and microphone 112 of the peripheral devices 124 of the console module 104. It is contemplated that other suitable connector ports may also be located in the console port zone 214 to facilitate using the devices 106, 108, 110, 112, 114, 116 in the console device and peripheral module 104 to control the remote servers 120A-120D of the computer server system 118.

In one embodiment, each of the computer connector zones 216A-D provide connection ports for connecting to a respective one of the servers 120A-D. Each computer connector zone 216A-D may include a designation. For example, each zone 216A-D may be assigned a unique number, such as 1 to 4. Each computer connector zone 216A-D respectively includes at least one or more of a High Definition Multimedia Interface (HDMI) compatible connection port 230A-D, a speaker port 232A-D, a microphone port 234A-D, and a USB port 236A-D. The USB ports 236A-D are configured to connect to a cable that can deliver keyboard, mouse and peripheral device signals. Each port formed in the computer connector zones 216A-D is configured to connect to a corresponding port of each server 120A-D. The connectors from the server connecting to the USB port 236A-D along with the HDMI compatible connection port 230A-D together form KVM ports which are configured to communicate with the console devices 122. The speaker ports 232A-D and the microphone ports 234A-D together form peripheral ports configured to communicate to the peripheral devices 124 disposed in the console device and peripheral module 104. It is noted that the number of the computer connector zones 216A-D and the number of each port 232A-D, 234A-D, 236A-D, 230A-D formed in the computer connector zones 216A-D may be varied as desired.

FIGS. 3A-3D depicts a top view of the control zone 168 illustrating different operation states. The control zone 168 includes the LED light zone 252A-D, 254 and their corresponding selector switches 250A-D. The control zone 168 includes the toggle switch 256. In one embodiment, each LED light zone 252A-D operates to indicate the status of connection of each computer connector zones 216A-D corresponding thereto. For example, when a computer connector zone, such as the computer connector zone 216A, is in communication with a server, the switch system 102 provides power (i.e., turns on) light indicators 258A, 260A, 262A of the LED light zone 252A corresponding to computer connector zone 216A, thus indicating which the computer connector zone (and accordingly, the server coupled thereto) is in communication with console devices 122 and/or the peripheral devices 124. Accordingly, the light indicators 258A-D, 260A-D, 262A-D provides a quick and reliable indication of which computer connector zone 216A-D is in communication with the servers 120A-D by the illumination of the corresponding LED light zone 252A-D.

In one embodiment, each LED light zone 252A-D includes at least three LED light indicators. A first light indicator 258A-D indicating the status of an audio speaker port 232A-D and/or microphone port 234A-D in the computer connector zone 216A-D is provided. The first light indicator 258A-D may be a speaker or microphone symbol. A second light indicator 260A-D is provided for indicating which computer connector zone 216A-D is in use. A third light indicator 262A-D is provided for indicating the status of a USB port in the computer connector zone 216A-D. The third light indicator 262A-D may be a USB symbol. It is contemplated that other symbols may be utilized for the indicators.

In one embodiment, the second light indicator 260A-D in each LED light zone 252A-D indicates the connection status of the console devices (KVM ports) including USB port 236A-D and/or the video port 230A-D of the computer connector zones 216A-D. In one embodiment, each LED light zone 252A-D is respectively numbered from 1 to 4 indicating an association of that zone with the corresponding computer connector zones 216A-D. Illumination of the LED light zone 252A-D provides an indication of the connection status of the computer connector zones 216A-D to the KVM ports. For example, As the second light indicator 260A-D illuminates, the number symbol 1-4 in each LED light zone 252A-D lights up so that users can easily identify which computer connector zone 216A-D is connected to the servers. For example, when a server, such as the server 120A, is connected to USB port 236A and/or video port 230A (e.g., KVM ports) of the first computer connector zone 216A, the second light indicator 260A in the first LED light zone 252A is energized to illuminate the number symbol "1" to indicate that the KVM ports 230A, 236A are in connection with the server 120A. In one embodiment, when the speaker port 232A and/or microphone port 234A are also connected, the first light indicator 258A is also energized to illuminate the speaker symbol to indicate that the speaker port 232A and/or microphone port 234A is connected with the server 120A. Similarly, when the USB port 236A is connected, the third light indicator 262A is energized to illuminate the USB symbol in the first LED light zone 252A to indicate the USB port 236A is connected to the server 120A. The other zones operate similarly.

Additionally, illumination of the LED light zone 252A-D may also have different brightness to indicate different states of operation. In some instances, the LED light may have a first level of brightness that may indicate which computer connector zone 216A-D connected to the corresponding one of the servers 120A-D. The LED light may have a second level of brightness of LED light illumination that may indicate which computer connector zone 216A-D is switched to be in connection with the console port zone 214 and readily to be operated by users. Detail description regarding functions of LED light illumination with different brightness will be further discussed below.

The control zone 168 also includes a central LED light zone 254 formed between the second LED light zone 252B and the third LED light zones C. The central light zone 254 has a first light indicator 164, a second light indicator 270, and a third light indicator 268. The first light indicator 264 and the third light indicator 268 are similar to the first 258A-D and the third light indicator 262A-D in each LED light zones 252A-D. The second light indicator 254 can be illuminated to show a KVM symbol. Operation and use of the central LED light zone 254 will be further discussed below with reference to FIG. 3C.

In the embodiment depicted in FIG. 3A, the control zone 168 is in a first state. All the LED light indicators in each LED light zones 252A-D, 254 are off, indicating an inactivated, e.g., a standby, status. In operation, as the power of the KVMP switch system 102 is turned on, the system 102 automatically determines which computer connector zones 216A-D have servers connected thereto. The light indicators 258A-D, 260A-D, 262A-D in each LED light zone 252A-D will then illuminate with the first level of brightness to indicate which computer connector zone 216A-D is coupled to a server. In one embodiment, the first level of brightness may be a low level of brightness, which may be about half the brightness of a normally illuminated LED.

The plurality of selector switches 250A-D, 256 is formed in the control zone 168 of the KVMP switch system 102 adjacent to the LED light zones 252A-D. Operation of each selector switch 250A-D controls selection of which computer connector zones 216A-D is coupled to the console port zone 214. For example, when the second selector switch 250B is activated, as shown in FIG. 3B, a command signal is provided to the processor 162 that operably couples ports of the console port zone 214 to the second computer connector zone 216B, thereby placing the console and periphery module 104 in communication with the servers 120B. When the second computer connector zone 216B is selected, the second light indicator 260B, e.g., the middle light indicator, in the corresponding second LED light zone 252B illuminates to a second brightness and/or blinks to indicate the console port zone 214 is now connected the second computer connector zone 216B. In one embodiment, the second level of brightness of the LED light is brighter than the first level of brightness. In one embodiment, the second brightness is the full brightness of the LED light. Similarly, when a different selector switch 250A, 250C-D is activated, the KVMP switch system 102 switches the connection of the console port zone 214 to the corresponding computer connector zone 216A, 216C-D so that the selected one of the servers 120A, 120C-D may be placed in communication with the console module 104. Accordingly, the LED light indicators 258A, 258C-D, 260A, 260C-D, 262A, 262C-D may also be energized and illuminated from the first level of brightness to the second level of brightness and/or blink to indicate different operational states.

In one embodiment, when the first selector switch 250A and the second selector switch 250B are simultaneously activated for over two seconds, the KVMP switch system 102 will automatically perform an auto scan process. The auto scan process detects which computer connector zones 216A-D are connected to which servers 120A-D.

In the example depicted in FIG. 3B, the light indicators 260A, 260B, 260D of the number 1, 2, 4 in the LED light zones 252A, 252B, 252D are illuminated, indicating the servers 120A, 120B, 120D are coupled to the ports of the computer connector zones 216A, 216B, 216D. As the second selector switch 250B is activated, the light indicator 260B illuminates to the second level of brightness and/or blinks as the console port zone 114 is switched into communication with the server 120B coupled to the second computer connector zone 216B. The first light indicator 258B and the third light indicator 262B in the second LED light zone 252B are both illuminated indicating that the set of the speaker port 232B and the microphone port 234B, and the USB port 236B are connected to the server 120B.

In conventional KVM switch systems, only synchronous switching of the KVM and peripheral devices between different servers is available all at one time. In other words, when switching control of the KVM ports among different servers to the console device, the peripheral ports connected to the same port zone are switched as well as the KVM ports.

Figure 3C:
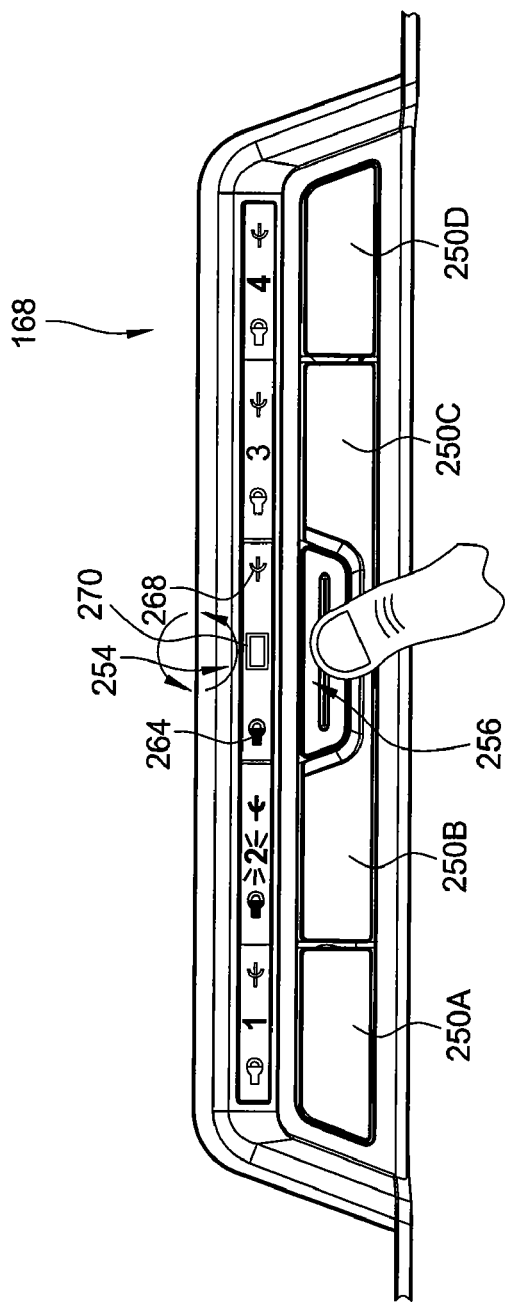

In the present invention, the toggle switch 256 is operable to select which of the ports of the computer control zone 216A-D are selected for coupling to their associated port of the console port zone 214. By utilizing the toggle switch 256, the types of peripheral ports and the KVM ports can be separately and individually selected for switching by the selector switch 254A-D associated with a particular computer control zone 216A-D. In one embodiment, the toggle switch 256 is operable between four selection modes. One or none of the first light indicator 264, the second light indicator 270, or the third light indicator 268 will illuminate to indicate the mode of the toggle switch 256. For example by each activation or push of the toggle switch 256 will cycle the selection mode between a predefined type of ports to be switched upon subsequent activation of one of the selector switches 250A-D. For example, when the toggle switch 256 is pushed once, the first light indicator 264 will become illuminated, as depicted in FIG. 3C, indicating that only a first predefined port(s) is selected for switching upon the subsequent activation of one of the selector switches 250A-D. Similarly, when a second push activates the toggle switch 256, the first light indicator 264 is extinguished and the second light indicator 270 become illuminated, indicating that only a second predefined port(s) is selected for switching upon the subsequent activation of one of the selector switches 250A-D. Furthermore, when a third push activates the toggle switch 256, the second light indicator 270 is extinguished and the third light indicator 268 becomes illuminated, indicating that only a third predefined port(s) is selected for switching upon the subsequent activation of one of the selector switches 250A-D. By a fourth push, all light indicators 264, 270, 268 are all extinguished and back to the standby status. In the standby status, activation of one of the selector switches 250A-D will couple all of the ports of the associated computer control zone 216A-D with the ports of the console zone 214. In one embodiment, the first, second and third predefined port(s) respectively are audio ports 234A-D, 232A-D, KVM ports 230A-D and the UBS ports 236A-D. Thus, the different light indicators 264, 270, 268 represent different selection status of KVM port 230A-D, 236A-D and peripheral ports 234A-D. For example, when the first light indicator 264 illuminates, a speaker/microphone symbol will appear in the central LED light zone 254. Similarly, when the second light indicator 270 illuminates, a KVM symbol will appear in the central LED light zone 254. Furthermore, when the third light indicator illuminates 254, a USB symbol will then appear.

Figure 3D:
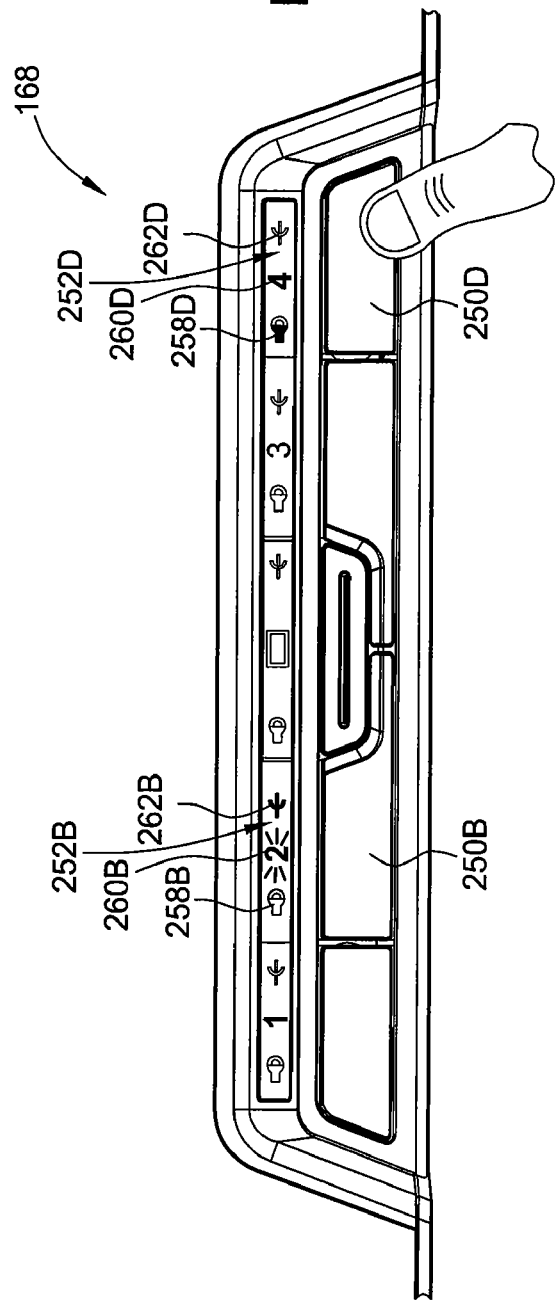

For example as depicted in FIGS. 3C and 3D switching a speaker/microphone peripheral port 232B, 234B from the second computer connector zone 216B (status indicated by illuminating the second LED light zone 252B) to the speaker/microphone peripheral port 232D, 234D in the fourth computer connector zone 216D (status indicated by illuminating the fourth LED light zone 252D), the toggle switch 256 is activated to provide a command signal that disconnects the connection of speaker/microphone peripheral port 232B, 234B to the console zone 214. Simultaneously, the first light indicator 264 (the speaker/microphone symbol light) is illuminated. When the first light indicator 264 illuminates, the speaker/microphone switch circuit in the KVMP switch system 102 is triggered and ready to be switched. Subsequently, the user may activate the fourth button 250D to switch connection of the speaker/microphone peripheral port from the second computer connector zone 216B to the fourth computer connector zone 216D, as shown in FIG. 3D. When switched, the first light indicator 258D (the speaker/microphone symbol light) in the fourth LED light zone 252D illuminates to indicate the speaker/microphone peripheral port in the fourth computer connector zone 216D is in connection with the console port zone 214. The KVM symbol light indicator 260B (number "2" symbol) in the second computer connector zone 216B remains illuminated and only the speaker/microphone symbol light indicator 258B is extinguished, indicating that only the speaker/microphone peripheral port has been switched from the second computer connector zone 216B to the fourth computer connector zone 216D (where the speaker/microphone symbol light indicator 258D is on). The console device 122 coupled to the console port zone 214 remains connected to the second computer connection zone 216B, as indicated by the KVM symbol light indicator 260B (number "2" symbol).

Similarly, if a user desires only to switch the connection of the KVM port from the first computer connector zone 216A to the second computer connector zone 216B without interrupting the speaker/microphone peripheral port 258A in the first connector zone 216A, the toggle switch 254 may be activated to illuminate the KVM (the second) light indicator 270, and then push the second selector switch 250B to switch connection of the KVM ports over to the second computer connector zone 216B. Control over the connection of the peripheral ports and KVM ports to the different computer connector zone 216A-D may be operated in a similar manner.

By doing so, individual control over each KVM ports and peripheral device ports in each computer connector zones 216A-D can be separately controlled without interference or interruption of the data flow through other ports in use. By utilizing the toggle switch 254 formed in the control zone 168, switching among different KVM ports and peripheral device ports in each computer connector zones 216A-D to the console device 122 and the peripheral devices 124 can be easily controlled.

Figure 4A:
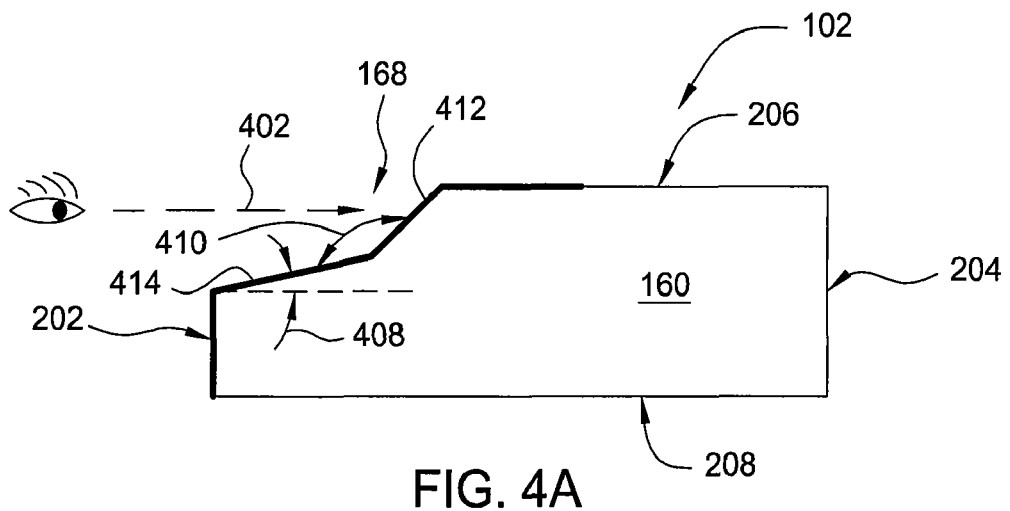
FIGS. 4A-C depict side views of the KVMP switch system of FIG. 1 illustrating different viewing angles.
Figure 4B:
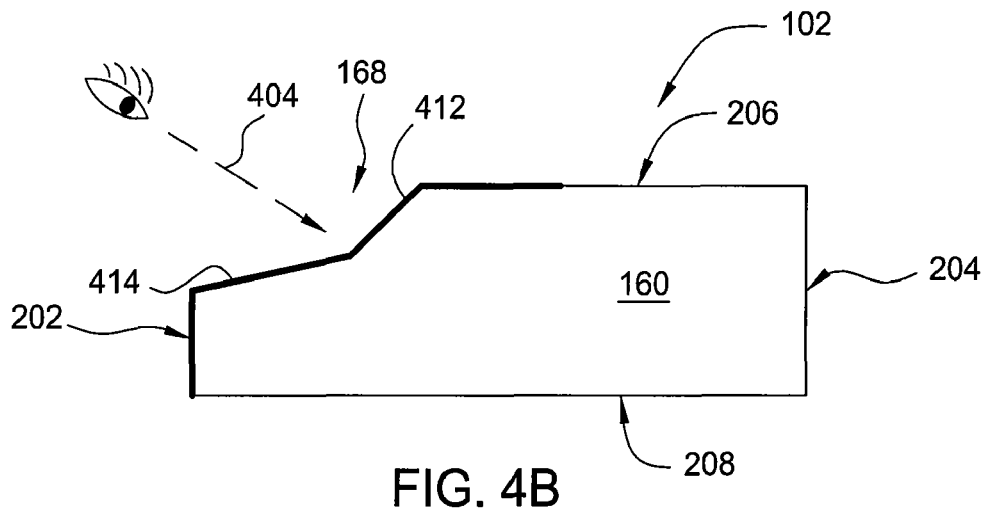
Figure 4C:
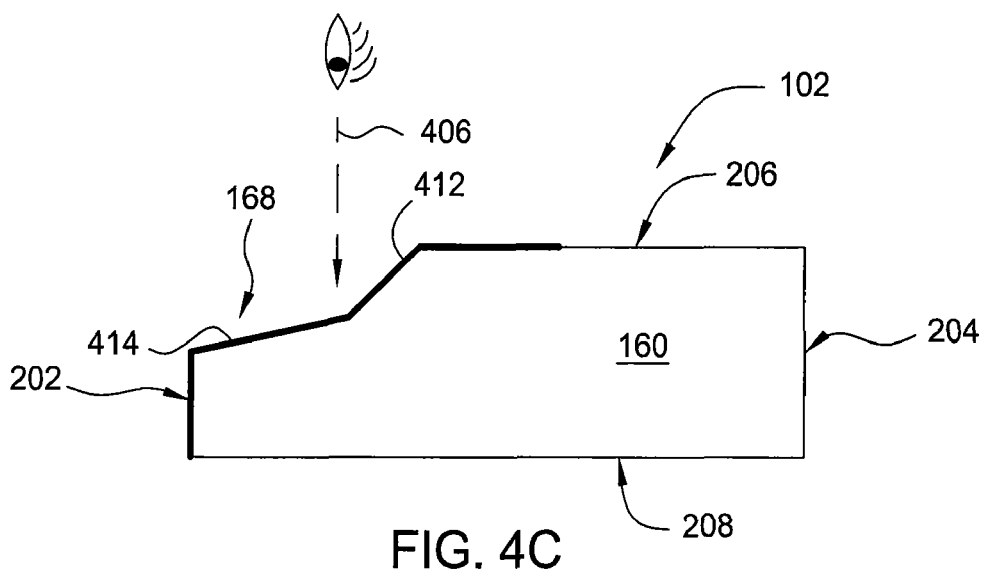

FIGS. 4A-C depict side views of the housing 160 of the KVMP switch system 102. In one embodiment, the control zone 168 is formed at the interface defined by the top 206 and the front side 202 of the body 282. The control zone 168 includes an upper surface 412 and a lower surface 414. The upper surface 412 includes the plurality of LED light zones 252A-D, 254 formed thereon, wherein the lower surface 414 includes the plurality of selector switches 250A-D, and toggle switch 256. The upper surface 412 is connected with the lower surface 412, forming an upper angle 410 greater than 90 degrees. The lower surface 414 forms a lower angle 408 less than 90 degrees to a horizontal surface, such as the top 206 or bottom 208 of the housing 160. The obtuse upper angle 410 and the acute lower angle 408 provide users with a good viewing angle regardless of whether the user is operating the KVM switch system 102 from a height 402 about even with the upper surface 412, as shown in FIG. 4A, or from a greater viewing angle 404, as shown in FIG. 4B, or from a substantially vertical viewing angle 406, as shown in FIG. 4C.

In one embodiment, the upper angle 410 is greater than 90 degrees, such as between about 95 degrees and about 180 degrees, for example between about 100 degrees and about 150 degrees, such as about 135 degrees. The lower angle 408 is less than about 90 degrees, such as about 0 degree to about 80 degrees, for example between about 30 degrees and about 80 degrees, for example about 45 degrees.

Thus, an improved KVMP switch system that can individually control each peripheral device and KVM ports connected to the KVMP switch system and methods of operating the same are provided. The individual switch control over each peripheral device and KVM ports to different servers can facilitate switch control of over peripheral devices or KVM ports from one computer server to another computer server connected to the KVMP switch system without interrupting operation of the other peripheral devices or KVM ports.

While the foregoing is directed to embodiments of the present invention, other and further embodiments of the invention may be devised without departing from the basic scope thereof, and the scope thereof is determined by the claims that follow.

What is claimed is:

1. A keyboard-video-mouse peripheral (KVMP) switch system for switching a plurality of console and peripheral devices with any one of a plurality of computer servers, comprising:
   a plurality of computer connector zones, each computer connector zone having a plurality of computer ports adapted to connect to a common computer server;
   a console port zone having a plurality of console ports adapted to connect to at least a console device and a peripheral device; and
   a control zone having:
     a toggle switch having at least two operable positions, the toggle switch operable to select at least one type of computer ports within a computer connector zone for coupling to one of the console ports; and
     a plurality of selector switches, each selector switch associated with a respective one of the computer connector zones and operable to couple the selected at least one type of computer ports of the associated computer connector zone to the one of the console ports.

2. The KVMP switch system of claim 1, wherein the control zone comprises:
   a plurality of LED light zones, wherein each LED light zone is configured to indicate which computer connector zones are connected to the console port zone.

3. The KVMP switch system of claim 2, wherein the LED light zone further comprises at least three light indicators operative to indicate which types of connectors of the computer connector zones is in communication with the console port zone.

4. The KVMP switch system of claim 1, wherein the plurality of computer ports of each computer connector zones comprises:
   at least one computer port selected from a group consisting of a display port, an audio port and at least one peripheral port.

5. The KVMP switch system of claim 4, wherein the toggle switch is configured to separately switch communication between the display port and peripheral ports in the computer connector zones to the console and peripheral device coupled to the console port zone.

6. The KVMP switch system of claim 4, wherein the at least one peripheral port is a USB port.

7. The KVMP switch system of claim 1, wherein console port zone comprises:
   at least one port selected from the group of USB port, a display port, an audio port and a power supply port.

8. The KVMP switch system of claim 1, wherein the control zone is formed at an interface between a top and a front side of the KVMP switch system.

9. The KVMP switch system of claim 8, wherein the control zone further comprises a first surface and a second surface, wherein the first surface includes the plurality of LED light zones while the second surface includes the plurality of the selector switches and the toggle switch.

10. A method of operating a keyboard-video-mouse peripheral (KVMP) switch system, the KVMP switch system having a plurality of selector switches, a plurality of computer connector zones each having one or more predefined types of computer ports adapted to connect to a common computer server, a console port zone, wherein each computer connector zone is associated with a respective one of the plurality of selector switches, and a toggle switch having at least two operable positions for selecting at least one type of computer ports within a computer connector zone for coupling to one of the console ports, the method comprising:
   operating the toggle switch of the KVMP switch system to select one or more of the predefined types of computer ports within a computer connector zone; and
   operating one of the selector switches to couple the associated computer connector zone to the console port zone, wherein only ports of the computer connector zone of the type selected by operation of the toggle switch are coupled by operation of the operated selector switch.

11. The method of claim 10, wherein operating the toggle switch further comprises:
   selecting one type of computer port selected from the group consisting of a display port, an audio port, a USB port and at least one periphery port.

12. The method of claim 10, wherein operating the toggle switch further comprises:
   activating the toggle switch to a first mode that selects a USB port and not an audio port or not a display port.

13. The method of claim 12, wherein activating the toggle switch further comprises:
   activating the toggle switch to a second mode that selects a periphery port and not a display port or not an audio port.

14. The method of claim 10, wherein operating the selector switches further comprises:
   activating one of selector switches to switch one of the predefined types of the computer ports in the computer connector zone to the respective ports defined in the console port zone.

15. A keyboard-video-mouse peripheral (KVMP) switch system for switching a plurality of console and peripheral devices with any one of a plurality of computer servers, comprising:
   a housing;
   a switching circuit disposed in the housing; and
   a control zone formed at an interface of a top and a front side of the housing, wherein the control zone has a first surface connected to a second surface, the control zone including a plurality of selector switches and a toggle switch formed in the second surface of the control zone, wherein the selector switches and toggle switch are capable of being actuated by touches of a user, wherein the toggle switch selects, from among the plurality of console or peripheral devices, one of the console or peripheral devices for connecting to a computer server, and the selector switches selects one of the computer servers for connecting to the selected type of console or peripheral devices.

16. The KVMP switch system of claim 15, further comprising:
   a plurality of LED light zones formed in the first surface of the control zone.

17. The KVMP switch system of claim 16, further comprising:
   a plurality of computer connector zones and a console port zone formed on a back side of the housing.

18. The KVMP switch system of claim 17, wherein the toggle switch selects one or more predefined types of ports disposed in the computer connector zone and the console port zone.

19. A keyboard-video-mouse peripheral (KVMP) switch system for switching a plurality of console and peripheral devices with any one of a plurality of computer servers, comprising:
   a plurality of computer connector zones, each computer connector zone having a plurality of computer ports adapted to connect to a common computer server;
   a console port zone having a plurality of console ports adapted to connect to at least a console device and a peripheral device; and
   a control zone having:
      a toggle switch having at least two operable positions, the toggle switch operable to select at least one type of computer ports within a computer connector zone for coupling to one of the console ports; and
      a plurality of selector switches, each selector switch associated with a respective one of the computer connector zones and operable to couple the selected at least one type of computer ports of the associated computer connector zone to the one of the console ports without interrupting any existing connection between any non-selected type of computer ports of any computer connector zones with the console ports.

20. The KVMP switch system of claim 1, wherein the control zone has a single toggle switch.

21. The method of claim 10, wherein the KVMP switch system has a single toggle switch.

22. The KVMP switch system of claim 15, wherein the control zone includes a single toggle switch.

23. The KVMP switch system of claim 19, wherein the control zone has a single toggle switch.

24. The KVMP switch system of claim 1, wherein the toggle switch is capable of being actuated independently of the plurality of selector switches, and each one of the selector switches is capable of being actuated independently of the toggle switch and other ones of the selector switches.

25. The method of claim 10, wherein the operating of the toggle switch and the operating of the one of the selector switches are independent of each other.

26. The KVMP switch system of claim 15, wherein the toggle switch is capable of being actuated independently of the plurality of selector switches, and each one of the selector switches is capable of being actuated independently of the toggle switch and other ones of the selector switches.

27. The KVMP switch system of claim 19, wherein the toggle switch is capable of being actuated independently of the plurality of selector switches, and each one of the selector switches is capable of being actuated independently of the toggle switch and other ones of the selector switches.

* * * * *